United States Patent
Ji et al.

(10) Patent No.: US 8,150,414 B2
(45) Date of Patent: Apr. 3, 2012

(54) METHOD FOR MAINTAINING THE CONTINUING EXISTENCE OF NPD IN IEEE 802.22.1 OPERATION

(75) Inventors: Baowei Ji, Plano, TX (US); David Mazzarese, Suwon-si (KR); Jinxia Cheng, Beijing (CN); Cheng Shan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 969 days.

(21) Appl. No.: 12/153,359

(22) Filed: May 16, 2008

(65) Prior Publication Data

US 2009/0011756 A1 Jan. 8, 2009

Related U.S. Application Data

(60) Provisional application No. 60/929,658, filed on Jul. 6, 2007, provisional application No. 60/935,135, filed on Jul. 27, 2007.

(51) Int. Cl.
*H04W 72/00* (2009.01)
*H04B 7/00* (2006.01)

(52) U.S. Cl. .......... 455/454; 455/41.2; 455/522
(58) Field of Classification Search ......... 455/41.2, 455/522, 454
See application file for complete search history.

(56) References Cited

U.S. PATENT DOCUMENTS

| | | |
|---|---|---|
| 2005/0013267 A1 | 1/2005 | An |
| 2005/0128982 A1 | 6/2005 | Kitchin |
| 2006/0018298 A1 | 1/2006 | Dilipkumar Jogi et al. |
| 2006/0164290 A1 | 7/2006 | Dawson |
| 2006/0274643 A1 | 12/2006 | Choyi et al. |
| 2008/0010208 A1* | 1/2008 | Callaway .......... 705/57 |

(Continued)

FOREIGN PATENT DOCUMENTS

EP 1 667 375 A1 6/2006

(Continued)

OTHER PUBLICATIONS

Zhongding Lei et al.: "A Reliable and Power Efficient Beacon Structure for Cognitive Radio Systems" IEEE Transactions on Broadcasting, IEEE Service Center, Piscataway, NY, US, vol. 54, No. 2, Jun. 1, 2008 ISSN: 0018-9316.

(Continued)

*Primary Examiner* — Marisol Figueroa

(57) ABSTRACT

Methods for maintaining continuing existence of a next-in-line protecting device in a beacon network including a primary protecting device (PPD), the next-in-line protecting device (NPD) and a plurality of secondary protecting devices (SPDs). In one method, a subset of the plurality of secondary protecting devices periodically transmit beacon messages to the primary protecting device. When the next-in-line protecting device disappears, the primary protecting device selects a secondary protecting device from among the secondary protecting devices that have transmitted the beacon messages within a certain period to be a new next-in-line protecting device. In another method, the plurality of secondary protecting devices continuously monitor an existence of the next-in-line protecting device. When the next-in-line protecting device disappears for a certain period of time, a subset of the plurality of secondary protecting devices may contend to be a new next-in-line protecting device. In still another method, the primary protecting device transmits a beacon message to the plurality of secondary protecting devices to indicate whether a next-in-line protecting device is required. When a next-in-line protecting device is required, a subset of the secondary protecting devices contend to be a new next-in-line protecting device.

29 Claims, 2 Drawing Sheets

U.S. PATENT DOCUMENTS

| | | | |
|---|---|---|---|
| 2008/0043863 A1 | 2/2008 | Ji et al. | |
| 2009/0097460 A1* | 4/2009 | Ji | 370/338 |
| 2010/0022205 A1* | 1/2010 | Henry et al. | 455/95 |
| 2010/0195505 A1* | 8/2010 | Cheng et al. | 370/241 |

FOREIGN PATENT DOCUMENTS

| | | |
|---|---|---|
| EP | 1667375 A | 6/2006 |
| KR | 10-0672040 | 1/2007 |

OTHER PUBLICATIONS

European Search Report issued on Nov. 24, 2008 corresponding to European Patent Application No. 08159774.2-2411.

Zhongding Lei, et al., "A Reliable and Power Efficient Beacon Structure for Cognitive Radio Systems", IEEE Transactions on Broadcasting, vol. 54, No. 2, Jun. 2008, p. 182-187.

European Search Report dated Nov. 24, 2008 in connection with European Patent Application No. EP 08 15 9774.2-2411.

Notification of Transmittal of the International Search Report and the Written Opinion of the International Searching Authority, or the Declaration dated Dec. 17, 2008 in connection with PCT Application No. PCT/KR2008/003971.

IEEE Std 802.22.1, "Part 22.1: Standard to Enhance Harmful Interference Protection for Low-Power Licensed Devices Operating in TV Broadcast Bands", Nov. 1, 2010, 144 pages.

IEEE P802.22, Wireless RANs, "Updated Text Related With the NPD Feature", IEEE 802.22-07/0541r0, Oct. 2007, pp. 1-4.

IEEE P802.22, Wireless RANs, "Analysis of Ceasing Transmission of Protecting Devices and Solutions", IEEE 802.22-07/0394r0, Aug. 2007, pp. 1-6.

* cited by examiner

METHOD FOR MAINTAINING THE CONTINUING EXISTENCE OF NPD IN IEEE 802.22.1 OPERATION

CLAIM OF PRIORITY

This application makes reference to, incorporates the same herein, and claims all benefits accruing under 35 U.S.C. §119 from provisional applications earlier filed in the U.S. Patent & Trademark Office on 6 Jul. 2007 and there duly assigned Ser. No. 60/929,658, and on 27 Jul. 2007 and there duly assigned Ser. No. 60/935,135, respectively.

BACKGROUND OF THE INVENTION

1. Field of the Invention

The present invention relates to methods, apparatus and software for maintaining continuing existence of a next-in-line protecting device (NPD) in an IEEE 802.22.1 system.

2. Description of the Related Art

The present invention incorporates by reference the Institute of Electrical and Electronics Engineers (IEEE) 802.22.1 Standard for Information technology: "*Telecommunications and information exchange between systems—Local and metropolitan area networks—Specific requirements, Part 22.1: Enhanced Protection for Low-Power, Licensed Devices Operating in Television Broadcast Bands*".

IEEE 802.22.1 defines a beacon network that offers enhanced protection for low power, licensed devices, such as wireless microphones, operating in television broadcast bands. The devices being protected are devices licensed as secondary under Title 47, Part 74, Subpart H in the U.S. Code of Federal Regulations, and equivalent devices in other regulatory domains.

The beacon network is constructed with three kinds of protecting devices: primary protecting device (PPD), secondary protecting device (SPD), and next-in-line protecting device (NPD). The PPD is a device that uses periodic beacons to protect its corresponding licensed device. The SPD is a device that shares the responsibility of protecting its corresponding licensed device with the PPD. An SPD occasionally sends beacons for the purpose of communicating with the PPD. The NPD is an SPD that will become a PPD in the event that the already existing PPD stops transmitting periodic beacon frames. That is, the PPD aggregates information from SPDs, periodically transmits beacon message, and provides primary beaconing functionality. When the PPD disappears, ideally the NPD shall promote itself as PPD. If both PPD and NPD disappear without warning, then a certain SPD will promote itself as the new PPD.

The contemporary NPD design is not complete. It is true that both PPD and SPDs could provide an indication after the NPD disappears for a certain time, but, if no SPD transmits any message to PPD, the PPD will not be able to promote any SPD as the new NPD. Consequently, the whole functionality of NPD is seriously weakened.

SUMMARY OF THE INVENTION

It is therefore an object of the present invention to provide an improved beacon network for protecting devices in a communication system.

It is another object of the present invention to provide a process, apparatus and software able to maintain continuing existence of a next-in-line protecting device in a beacon network.

According to one aspect of the present invention, a plurality of protective devices are provided to protect a plurality of licensed devices. The plurality of protective devices include a primary protecting device, a next-in-line protecting device, and a plurality of secondary protecting devices. A first subset of the plurality of secondary protecting devices periodically transmit beacon messages to the primary protecting device in a regular period of T1. In this way, when the next-in-line protecting device disappears, the primary protecting device may select a secondary protecting device from among the secondary protecting devices that have transmitted the beacon messages within a certain period to be a new next-in-line protecting device.

In addition, the plurality of secondary protecting devices may continuously monitor the existence of the next-in-line protecting device. When the next-in-line protecting device disappears for a period of time T2, a second subset of the plurality of secondary protecting devices may contend to be a new next-in-line protecting device. In this way, the primary protecting device may select a secondary protecting device from among the second subset of secondary protecting devices that contend to be the new next-in-line protecting device, to be the new next-in-line protecting device.

T2 may be less than T1.

The primary protecting device may be provided with a memory unit containing information of the secondary protecting devices that have transmitted beacon messages within the certain period.

In addition, the plurality of secondary protecting devices may continuously monitor an existence of the primary protecting device. When the primary protecting device disappears for a period of time T3, the plurality of secondary protecting devices may contend to be a new primary protecting device.

T2 may be less than T3.

According to yet another aspect of the present invention, the primary protecting device transmits a beacon message indicating whether a next-in-line protecting device is required. When the primary protecting indicates that a next-in-line protecting device is required, a subset of the plurality of secondary protecting devices contend to be a new next-in-line protecting device. Then, the primary protecting device selects a secondary protecting device from among the subset of the secondary protecting devices to be the new next-in-line protecting device.

The beacon message transmitted by the primary protecting device includes an indication field consisting of two bits. An indication field of "00" indicates that there is no next-in-line protecting device and a next-in-line protecting device is required. An indication field of "11" indicating that there is no next-in-line protecting device and no next-in-line protecting device is required. An indication field of "01" indicates that there is a next-in-line protecting device.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

This invention creates a method and procedures for maintaining continuous NPD operation after the prior NPD disappears without warning.

Figure 1:
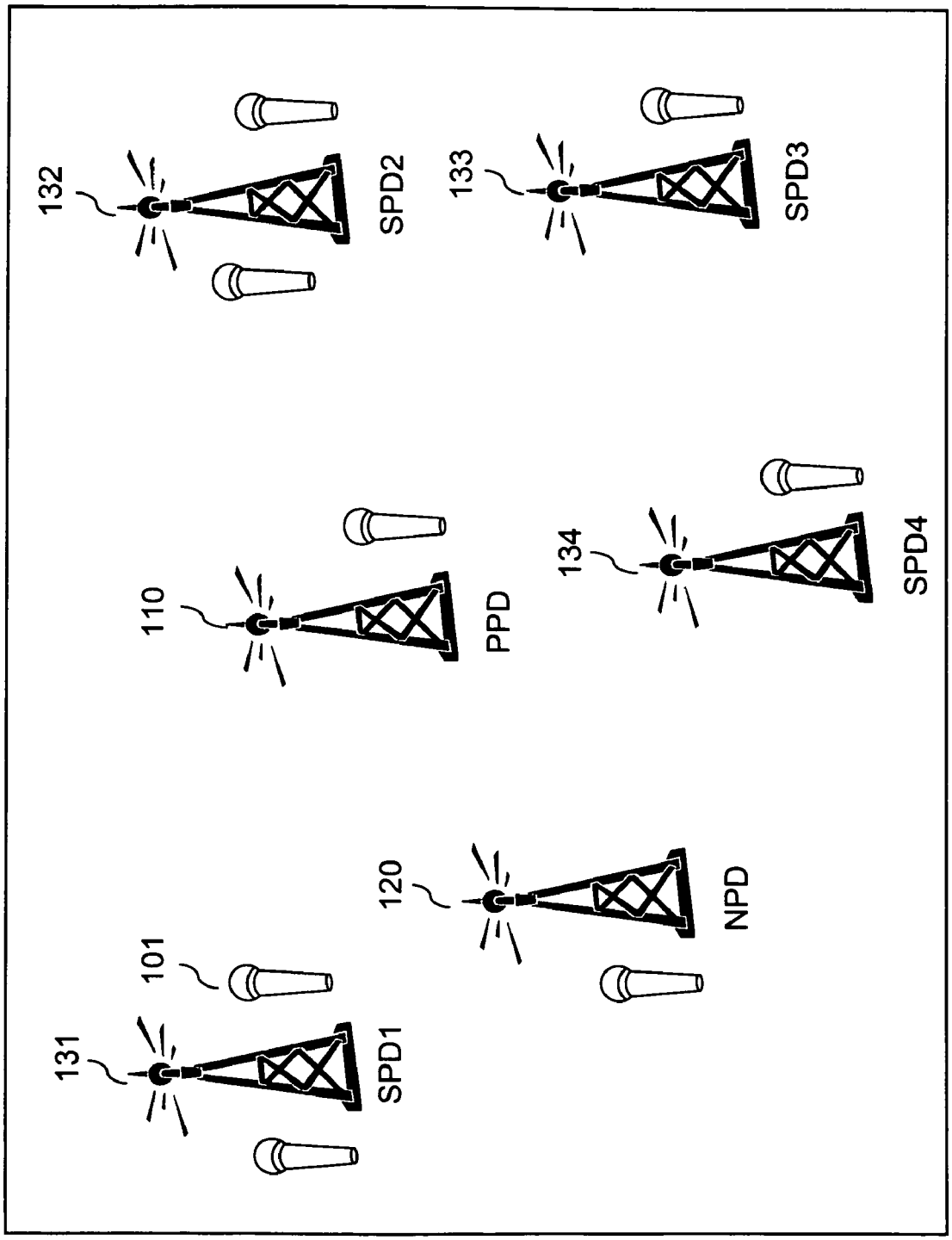
FIG. 1 schematically illustrates a beacon network in which the principles of the present invention can be implemented.

FIG. 1 schematically illustrates a beacon network using a primary protecting device (PPD) 110, secondary protecting devices (SPDs) 131, 132, 133, and 134, and a next-in-line protecting device (NPD) 120 for protecting wireless microphones 101 operating in a neighborhood. Each protecting device protects a certain area where a number of wireless microphones 101 are located. Note that there is no specific relationship between a protecting device and the number of wireless microphones that are associated with the protecting device, as long as the protecting device offers sufficient coverage so that the operation of those wireless microphones are protected.

When PPD 110 disappears, NPD 120 is supposed to be the first protecting device to promote itself no matter whether PPD 110 disappears normally or abnormally. It is important for the cluster of protecting devices to keep a functional NPD. Contemporarily, PPD 110 could not promote an SPD to be a new NPD unless the SPD has just successfully transmitted a beacon frame to PPD 110. In that case, if NPD 120 disappears and no SPD sends any beacon message to PPD 110, PPD 110 will not be able to promote any SPD to be the new NPD. In other words, the contemporary design may result in no NPD for a long time.

Figure 2:
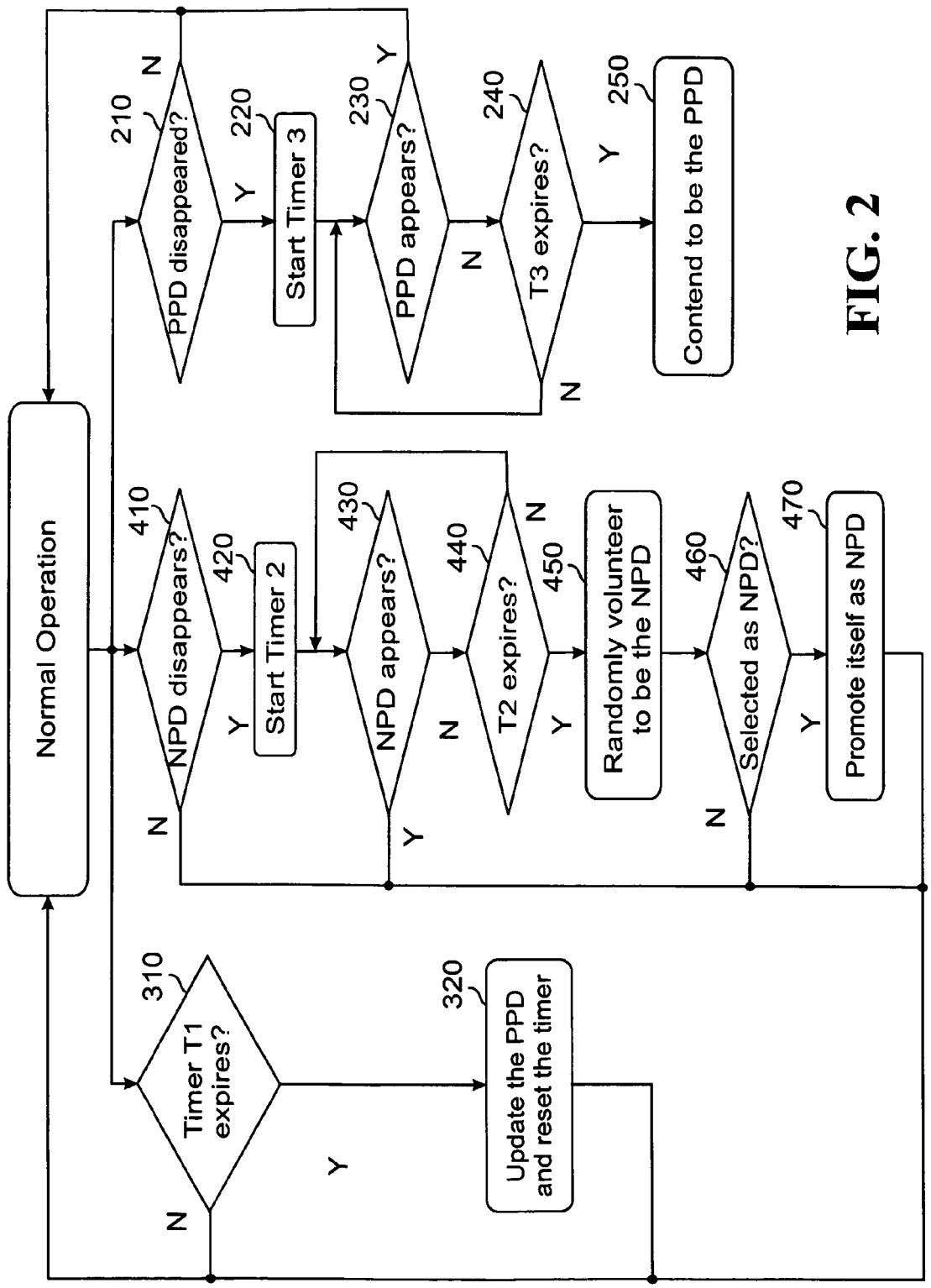
FIG. 2 is a flow chart illustrating a normal operation of a SPD according to the principles of the present invention.

FIG. 2 is a flow chart illustrating three sets of operation steps of a SPD according to the principles of the present invention. The rightmost branch of the operational steps 210 through 250 is compatible with the contemporary art, and correspond to an SPD promoting itself to be the new PPD whenever there is no PPD for a certain time indicated as T3 herein. Specifically, first, the SPD determines whether the PPD disappears (step 210). If the PPD disappears, the SPD starts a timer T3 (step 220). Then, the SPC checks the PPD appears (step 230). If the PPD does not appear, the SPD checks whether the timer T3 expires (step 240). When timer T3 expires, the SPD contends with other SPDs to be a new PPD (step 250).

A significant operation failure in the contemporary design is that the PPD could not promote an SPD to be the NPD unless the SPD has just successfully sent a beacon frame to the PPD. In that case, if the NPD disappears and no SPD sends any RTS (request-to-sent) and beacon messages to the PPD, the PPD will not be able to successfully promote any SPD to be the new NPD. In other words, the current design could result in a network with no NPD for a long time.

Method 2 as illustrated in the center branch of FIG. 2 functions as one remedy for this problem. In Method 2 as illustrated by steps 410 through 470 in the center branch, each SPD continuously monitors the existence of the NPD. If the NPD disappears for a certain time indicated as T2 herein, all the SPDs involved will randomly contend to send a beacon frame to the PPD so that the PPD could have a chance to promote a SPD to be the new NPD. The contention should incorporate some random backoff time for contention resolution purpose. Specifically, first, the SPD determines whether the NPD disappears (step 410). If the NPD disappears, the SPD starts a timer T2 (step 420). Then, the SPD determines whether the NPD appears (step 430). If the NPD does not appear, the SPD checks whether the timer T2 expires (step 440). When timer T2 expires, the SPD tries to transmit a beacon message to the PPD to contend with other SPDs to be the new NPD (step 450). Then, the SPD determines whether it has been selected as the new NPD (step 460). When the SPD has been selected, the SPD promotes itself to be the new NPD (step 470). As soon as one SPD is promoted to be the new NPD, all other SPD quit the contention and go back to normal operation. The combination of steps 450, 460 and 470 means that a plurality of SPDs contend (i.e., randomly volunteer) to be a new NPD. Note that this invention is not limited to any particular contention procedure.

Another significant operational failure in the network advocated by the current draft of IEEE 802.22.1 is that the PPD is required to continue transmitting the obsolete information of those disappeared SPDs. Method 1 in the leftmost branch of FIG. 2 illustrates steps 310 and 320 as a remedy for that operational failure. Each SPD could maintain a timer T1 whose expiration triggers the SPD to update the PPD. This kind of periodic transmission from the SPDs will give the PPD opportunities to validate the information aggregated in its beacon frames. If a SPD does not update the PPD after T1 period, or multiple T1 periods, the PPD could safely assume that SPD has disappeared. Therefore, the PPD could remove that SPD's information from its beacon frame. Specifically, the SPD determines whether timer T1 expires (step 310). If timer T1 expires, the SPD transmits the beacon message to the PPD and rests the timer T1 (step 320). This kind of periodic transmission from the SPDs will also give the PPD an opportunity to promote a SPD as the new NPD if the previous NPD disappears. Therefore, this method could serve as a second remedy for maintaining the continue existence of the NPD.

The specific values of all the timers should be predetermined and kept constant among all the protecting devices for the whole system to work properly. The values should be chosen considering the maximum tolerable period of non-beacon transmission. Since NPD should be the first candidate to be the new PPD if the previous PPD disappears, timer T2 shall be shorter than timer T3. Timer T1 is a tradeoff of validating SPD's information timely and not to interrupt the PPD's transmission too frequently.

Method 1 and Method 2 are not mutually exclusive. That is, the SPD can perform Method 1 and Method 2 simultaneously. The specific values of all the timers should be predetermined and kept constant among all the protecting devices for the whole system to work properly. The primary function of T1 is for an SPD to periodically update the PPD. If there is no update from an SPD for a certain time (say, one or multiple T1 long), the PPD should assume that this SPD has disappeared and should remove its information from the PPD beacon message. This is one of the novel improvement contributed by this design, which has been accepted into IEEE 802.22.1. The secondary usage of T1 is the PPD could promote one SPD to be the NPD after this SPD updates the PPD. In other words, T1 should be a short enough so that the PPD could identify a disappeared SPD quickly, and long enough so that SPD does not update the PPD too frequently. Since the NPD should be the first candidate to be the new PPD if the previous PPD disappears, timer T2 shall be shorter than timer T3. Small T1, however, also means frequent transmissions from SPDs, which is not so desirable. If both T1 and T2 are used, T2 could be a small value to ensure that a new NPD will be chosen shortly after the previous NPD disappears. Meanwhile, T1 could be a larger value to ensure that SPDs would keep the PPD update regarding the existence of the SPDs at least once every T1 period. Typically, T2 and T3 could be of several seconds whereas T1 could of several minutes.

In other words, the scheme with timer T2 is more appropriate for maintaining the uninterrupted existence of NPD in the cluster. The scheme with timer T1 ensures the PPD that a specific SPD still exists. In this case, if a SPD does not transmit a beacon message to the PPD after a T1 period, or multiple T1 periods, the PPD could safely assume that SPD has disappeared. Therefore, the PPD could remove that SPD's information from the PPD's beacon frame. This mechanism is not included in the prior art either. We believe it is essential for guarantee that the information carried in the PPD are up to date and valid.

Alternatively, Method 3 is proposed for a slightly different situation where the function of the NPD is not mandated for all the time unless the NPD is required by the PPD, according to the principle of the present invention. In this case, if the PPD indicates that it needs a volunteer for being selected as the new NPD, all the SPDs shall try to send RTS to the PPD in a contention manner until one of them is selected as the new NPD. If the PPD indicates that the PPD does not need the NPD, the SPDs do not have to volunteer to be an NPD even though there is no NPD. The indication from the PPD could be implemented in different ways using variant message fields. As an example, we define a message filed of two bits in the PPD beacon header as follows.

TABLE 1

The description of the NPD indication field in the PPD message

| NPD indication filed | | Explanation | |
|---|---|---|---|
| Bit 1 | Bit 2 | NPD existence | Volunteer needed | Comment |
| 0 | 0 | No | Yes | There is no NPD, and the SPDs shall volunteer transmission for being selected as the new NPD. |
| 1 | 1 | No | No | There is no NPD. And, NPD is not required. |
| 0 | 1 | Yes | N/A | There is a NPD. |
| 1 | 0 | | | RESERVED |

The NPD indication field is transmitted with every PPD beacon frame. When the NPD indication field is '00' as shown in Table 1, the SPDs know that there is no NPD and volunteers are required. Therefore, the SPDs go through some contention procedure to try to transmit an RTS and a beacon frame to the PPD, so that the PPD could select a SPD from among the SPDs as a new NPD.

When the NPD indication field is '11', the SPDs know that there is no NPD and the PPD will not select the NPD. In this case, the SPDs will not volunteer to be the NPD even knowing that there is no NPD. Note that this is different from the requirement of Methods 1 and 2. It might also imply that when the PPD disappears abnormally, all the SPDs shall not wait for the NPD (who does not exist), and they shall compete to be the new PPD directly.

When the NPD indication field is '01', the SPDs know that there is an NPD. In this case, the SPDs could still be required to monitor the existence of the NPD. Alternatively, the SPDs may do nothing regarding the operation of the NPD until the value of the NPD indication filed has changed. Only the three cases are related to the discussion. So the value of '10' is reserved. Note that the values could be defined differently from the table, and even other indication methods could be used by the PPD.

In addition, the usage of this 2-bit indication field could support many other scenarios. For example, the change of the indication field from "01" to "00" implies the PPD has deselected the current NPD, and the PPD is requesting for new volunteers to be the new NPD. Another example, the change of the indication field from "01" to "11" indicates the PPD has decided not to have the NPD. In either case, the current NPD shall change itself to a regular SPD.

Note that all the three methods, i.e, Methods 1, 2 and 3 can be performed at the same time, albeit perhaps for different purposes. Method 1, for example, may be invoked to allow the SPD to periodically update the PPD that the SPD is still alive. Method 2 may be invoked to allow the SPDs to monitor the existence of the NPD, in addition to the information available from Method 3. This applies for a scenario that some SPDs may be outside of the radio coverage of the NPD. In that case, those SPDs may know that the PPD has assigned one NPD (i.e., 2-bit indication field equals to "01"), but the SPDs may also know that they are outside of the protection by this NPD if the current PPD disappears. In that case, those SPDs may decide not to seek the protection from the new PPD (i.e., the original NPD). Method 3, i.e., using 2-bit indication field, may be invoked to allow the PPD to inform the system about the operation of the NPD. Also each of the three methods can be selectively performed in variable combination with themselves according to operational need e.g. 2 methods or 3 methods.

While the forgoing explanation of the principles of the present invention have been shown and described in detail in connection with the preferred embodiments, it will be apparent to those skilled in the art that modifications and variations can be made without departing from the spirit and scope of the invention as defined by the appended claims.

What is claimed is:

1. A method for providing protection in a communication system, the method comprising:
    providing a plurality of protective devices protecting a plurality of licensed devices, the plurality of protective devices comprising a primary protecting device and a plurality of secondary protecting devices;
    transmitting, via the primary protecting device, a beacon message indicating whether a next-in-line protecting device is required;
    when the primary protecting device indicates that a next-in-line protecting device is required, contending, by a subset of the plurality of secondary protecting devices, to be a new next-in-line protecting device; and
    selecting, by the primary protecting device, a secondary protecting device from among the subset of the secondary protecting devices to be the new next-in-line protecting device.

2. The method of claim 1, wherein the beacon message transmitted by the primary protecting device comprises an indication field,
    if the indication field is a first value, the indication field indicates that there is no next-in-line protecting device and a next-in-line protecting device is required,
    if the indication field is a second value, the indication field indicates that there is no next-in-line protecting device and no next-in-line protecting device is required, and
    if the indication field is a third value, the indication field indicates that there is a next-in-line protecting device.

3. The method of claim 2, wherein:
    a change of the indication field from the third value to the first value indicates that the primary protecting device has deselected the current next-in-line protecting device, and a new next-in-line protecting device is required; and
    a change of the indication field from the third value to the second value indicates that the primary protecting device has deselected the current next-in-line protecting device, and no next-in-line protecting device is required.

4. The method of claim 1, further comprising:
periodically transmitting, via a first subset of the plurality of secondary protecting devices, beacon messages to the primary protecting device in a regular period of time T1; and
transmitting, by the primary protecting device, a beacon frame signal containing information of the secondary protecting devices that have transmitted the beacon messages within a certain period of time.

5. The method of claim 4, further comprising:
continuously monitoring, by a second subset of the plurality of secondary protecting devices, an existence of the next-in-line protecting device; and
when the next-in-line protecting device disappears and the primary protecting device indicates that a next-in-line protecting device is required, contending, by the second subset of the secondary protecting devices, to be a new next-in-line protecting device.

6. The method of claim 1, further comprising:
continuously monitoring, by a subset of the plurality of secondary protecting devices, an existence of the next-in-line protecting device; and
when the next-in-line protecting device disappears and the primary protecting device indicates that a next-in-line protecting device is required, contending, by the subset of the secondary protecting devices, to be a new next-in-line protecting device.

7. A method for providing protection in a communication system, the method comprising:
providing a plurality of protective devices protecting a plurality of licensed devices, with the plurality of protective devices comprising a primary protecting device, a next-in-line protecting device, and a plurality of secondary protecting devices;
periodically transmitting, via a first subset of the plurality of secondary protecting devices, beacon messages to the primary protecting device in a regular period of time T1;
transmitting, by the primary protecting device, a beacon frame signal containing information of the secondary protecting devices that have transmitted the beacon messages within a certain period of time; and
when the next-in-line protecting device disappears, selecting, by the primary protecting device, a secondary protecting device from among the secondary protecting devices that have transmitted the beacon messages within a certain period of time to be a new next-in-line protecting device.

8. The method of claim 7, further comprising:
continuously monitoring, by a second subset of the plurality of secondary protecting devices, an existence of the next-in-line protecting device;
when the next-in-line protecting device disappears for a second period of time T2, contending, by the second subset of the secondary protecting devices, to be a new next-in-line protecting device; and
selecting, by the primary protecting device, a secondary protecting device from among the second subset of secondary protecting devices to be the new next-in-line protecting device.

9. The method of claim 8, wherein T2 is less than T1.

10. The method of claim 8, further comprising:
continuously monitoring, by a third subset of the plurality of secondary protecting devices, an existence of the primary protecting device; and
when the primary protecting device disappears for a third period of time T3, contending, by the third subset of secondary protecting devices, to be a new primary protecting device.

11. The method of claim 10, wherein T2 is less than T3.

12. The method of claim 7, wherein the certain period of time is T1.

13. The method of claim 7, wherein the certain period of time is m×T1, where m is a positive integer.

14. The method of claim 7, further comprising:
continuously monitoring, by a third subset of the plurality of secondary protecting devices, an existence of the primary protecting device; and
when the primary protecting device disappears for a third period of time T3, contending, by the third subset of secondary protecting devices, to be a new primary protecting device.

15. A method for providing protection in a communication system, the method comprising:
providing a plurality of protective devices protecting a plurality of licensed devices, the plurality of protective devices comprising a primary protecting device, a next-in-line protecting device, and a plurality of secondary protecting devices;
continuously monitoring, by a first subset of the plurality of secondary protecting devices, an existence of the next-in-line protecting device;
when the next-in-line protecting device disappears for a period of time T2, contending, by the first subset of the plurality of secondary protecting devices, to be a new next-in-line protecting device; and
selecting, by the primary protecting device, a secondary protecting device from among the first subset of the secondary protecting devices to be the new next-in-line protecting device.

16. The method of claim 15, further comprising:
continuously monitoring, by a second subset of the plurality of secondary protecting devices, an existence of the primary protecting device; and
when the primary protecting device disappears for a period of time T3, contending, by the second subset of secondary protecting devices, to be a new primary protecting device.

17. The method of claim 16, wherein T2 is less than T3.

18. A secondary protecting device for providing protection in a communication system, the secondary protecting device configured to:
periodically transmit a beacon message to a primary protecting device, in a regular period of time T1, in a beacon network comprising the primary protecting device, a plurality of secondary protecting devices, and a next-in-line protecting device;
when the next-in-line protecting device disappears, determine whether the secondary protecting device itself has been selected by the primary protecting device to be a new next-in-line protecting device; and
if the secondary protecting device has been selected to be the new next-in-line protecting device, promote the secondary protecting device itself to be the new next-in-line protecting device.

19. The secondary protecting device of claim 18, the secondary protecting device further configured to:
continuously monitor an existence of the next-in-line protecting device;

when the next-in-line protecting device disappears for a period of time T2, contend with other secondary protecting devices in the beacon network to be a new next-in-line protecting device;

determine whether the secondary protecting device itself has been selected by the primary protecting device to be the new next-in-line protecting device; and if the secondary protecting device has been selected to be the new next-in-line protecting device, promote the secondary protecting device itself to be the new next-in-line protecting device.

20. The secondary protecting device of claim 19, wherein T2 is less than T1.

21. The secondary protecting device of claim 19, the secondary protecting device further configured to:

continuously monitor an existence of the primary protecting device; and when the primary protecting device disappears for a period of time T3, contend with the other secondary protecting devices to be a new primary protecting device.

22. The secondary protecting device of claim 19, wherein T2 is less than T3.

23. The secondary protecting device of claim 18, the secondary protecting device further configured to:

continuously monitor an existence of the primary protecting device; and when the primary protecting device disappears for a period of time T3, contend with the other secondary protecting devices to be a new primary protecting device.

24. A primary protecting device for providing protection in a communication system, the primary protecting device configured to:

receive beacon messages from a subset of a plurality of secondary protecting devices in a beacon network comprising the primary protecting device, the plurality of secondary protecting devices, and a next-in-line protecting device;

store information of the secondary protecting devices that have transmitted beacon messages within a certain period in a memory unit; and when the next-in-line protecting device disappears, select a secondary protecting device from among the secondary protecting devices whose infoimation is currently stored in the memory unit to be a new next-in-line protecting device.

25. A secondary protecting device for providing protection in a communication system, the secondary protecting device configured to:

continuously monitor an existence of a next-in-line protecting device in a beacon network comprising a primary protecting device, a plurality of secondary protecting devices, and the next-in-line protecting device;

when the next-in-line protecting device disappears for a period of time T2, contend with other secondary protecting devices in the beacon network to be a new next-in-line protecting device;

determine whether the secondary protecting device itself has been selected by the primary protecting device to be the new next-in-line protecting device; and if the secondary protecting device has been selected to be the new next-in-line protecting device, promote the secondary protecting device itself to be the new next-in-line protecting device.

26. The secondary protecting device of claim 25, the secondary protecting device further configured to:

continuously monitor an existence of the primary protecting device; and when the primary protecting device disappears for a period of time T3, contend with the other secondary protecting devices to be a new primary protecting device.

27. The secondary protecting device of claim 26, wherein T2 is less than T3.

28. A primary protecting device for providing protection in a communication system, the primary protecting device configured to:

transmit a beacon message indicating whether a next-in-line protecting device is required in a beacon network comprising the primary protecting device and a plurality of secondary protecting device; and when the primary protecting device indicates that a next-in-line protecting device is required and a subset of the plurality of secondary protecting devices contend to be a new next-in-line protecting device, select a secondary protecting device from among the subset of the secondary protecting devices to be the new next-in-line device.

29. The primary protecting device of claim 28, wherein the beacon message comprises an indication field, if the indication field is a first value, the indication field indicates that there is no next-in-line protecting device and a next-in-line protecting device is required, if the indication field is a second value, the indication field indicates that there is no next-in-line protecting device and no next-in-line protecting device is required, and if the indication field is a third value, the indication field indicates that there is a next-in-line protecting device.

\* \* \* \* \*